United States Patent [19]

Pickler

[11] Patent Number: 4,599,031

[45] Date of Patent: Jul. 8, 1986

[54] TRASH COMPACTOR AND TRANSPORTING MECHANISM

[76] Inventor: Nathan L. Pickler, P.O. Box 528, Spencer, N.C. 28159

[21] Appl. No.: 387,505

[22] Filed: Jun. 11, 1982

[51] Int. Cl.[4] .......... B60P 1/00

[52] U.S. Cl. .......... 414/507; 100/178

[58] Field of Search .......... 414/507, 525 R; 100/178

[56] References Cited

U.S. PATENT DOCUMENTS

| | | | |
|---|---|---|---|
| 2,076,504 | 4/1937 | Ochsner | 414/525 |
| 3,889,588 | 6/1975 | Wollersheim | 414/525 X |
| 4,069,929 | 1/1978 | Harker | 414/525 X |

FOREIGN PATENT DOCUMENTS

| | | | |
|---|---|---|---|
| 1196122 | 11/1959 | France | 414/525 |
| 529993 | 6/1955 | Italy | 414/507 |

*Primary Examiner*—L. J. Paperner
*Assistant Examiner*—Ken Muncy
*Attorney, Agent, or Firm*—Donald L. Weinhold, Jr.

[57] ABSTRACT

This invention relates to an improved apparatus for refuse collection vehicles and in particular, an improved mechanism for compacting trash and loading the refuse collection vehicle with compressed refuse. A special rotary compactor operates to compact relatively small quantities of trash which are forced into the storage compartment of the refuse collection vehicle. The machine prepacks garbage in relatively small quantities which upon full compaction is forced by continued compacting action from a collection hopper into the garbage collection and carrying compartment.

14 Claims, 4 Drawing Figures

TRASH COMPACTOR AND TRANSPORTING MECHANISM

BACKGROUND OF INVENTION

Garbage collection, transportation and disposition has become in modern times a generally expected and recognized municipal government function. As municipalities continue to grow, trash volumes continue to mount, operation costs continue to escalate and demands continue to increase, and more effective and efficient means of handling refuse becomes more important. In areas where municipal services are not available, private refuse collection organizations attach similar significance to efficiency and effectiveness in operation.

Collecting trash or refuse and delivering it to a disposal site has become so prevalent that many trips of each truck are required daily to accomplish the daily task of sanitation departments or organizations. As disposal sites become more and more filled with refuse new and larger sites are required, more commonly at locations further removed from the collection sites. With higher energy costs and operating expenses, the number of trips to a disposal site becomes increasingly critical. The more time that is spend driving to and from a disposal site, the less time is available to garbage pick-up and the more trucks, manpower, operating expenses, and energy costs are expended and therefore the more costly such services become. To prevent such services from becoming costs prohibitive, greater efficiency has been emphasized.

It is well recognized that most garbage trucks are designed to carry heavy loads. However, their weight limit is seldom exceeded before their volume limit is reached. In other words, each truck could handle more refuse per load if the refuse volume can be decreased thus increasing efficiency.

The greater the volume reduction component, the more efficient the collection operation. Many compacting mechanisms are known in the art; the degree of compaction becoming a factor of several variables, including cost, size, mechanism, and principle involved. The more expensive and sophisticated machine makes operations more efficient but initial capital outlay for equipment often becomes cost prohibitive per se.

Well recognized in the art is the necessity to compact refuse prior to disposal for efficiency. Bulk refuse is generally hand delivered in relatively small quantities to the compacting mechanism or is delivered by smaller trucks in larger volumes to a larger compacting unit for volume reduction through crushing and compacting the refuse and discharging the compacted material to a storage and conveying vehicle which disposes of a load when filled to capacity. Again, volume limits are generally reached well prior to weight limits generally because of inefficient compacting means. Consequently efficiency is also limited.

Generally, garbage trucks utilize a hopper section for receiving loose household refuse, a scraping and compacting mechanism to compact the trash and a storage compartment to hold the compacted trash for later discharge. The universally recognized problems are insufficient compaction and high cost of equipment. The present invention utilizes the recognition that greater compaction efficiency can be realized by compacting small quantities of trash before transferring it to a separate storage compartment. Prepacting the refuse increases efficiency. Also, smaller compacting units are less expensive.

OPERATION

The instant invention includes primarily the utility of a hopper which receives household or other loose refuse and which acts as a prepacker of the refuse in small quantities. The result is a more efficient and satisfactory reduction of refuse volume so that more weight may be carried and less trips to a disposal site are required.

In actual operation, loose refuse is dumped from a can or other container into a partial or semi-cylindrical trash hopper. A compacting mechanism is then activated which rotates a drum located within the hopper. Slideably attached through the drum is a compacting panel which turns slowly with the said drum. As the said compacting panel turns it sweeps the trash in the hopper toward a discharge door. The said drum is located eccentrically within the said hopper. The said compacting panel extends through the drum and is slideably engaged through the center of the said drum so that as the panel rotates with the drum it is forced by the hopper walls to move in and out of the said drum, constantly changing the dimension of the said compacting panel which extends from each side of said drum as the drum rotates.

The hopper is tilted at an angle toward the rear of the vehicle for ease of loading and to facilitate the sliding action of the compaction panel as hereinafter more clearly described.

In the loading position, the dimension of the compacting panel which sweeps the trash is at its longest; gravity pulling the panel through the said drum to its lowest point of elevation, perpendicular to the plane of the road surface. As the trash is swept toward the discharge door located in the upper area of the hopper, the dimension of the compaction panel decreases and the trash is compacted between the compaction panel and the side wall of the hopper. The reduction in the volume of the hopper measured between the discharge door and the compaction panel as the drum and compaction panel rotate acts as a squeezing or compaction function to also reduce the volume of the refuse.

As the compressed trash is swept toward the discharge door continual compaction tends to force the discharge door open. The discharge door is held in its normally closed position by coiled springs. Coil springs act to further compress the refuse until the compression force overcomes the coil springs force and the discharge door is forced to the open position. Compressed garbage is them forced through the opening and through the door assembly to a storage cmpartment.

As compressed refuse enters the storage compartment, the discharge door returns to the closed position and the compaction panel slides through the drum the opposite end of said panel now becomes the sweeping end. As the drum continues to rotate, the compactor panel is forced back to the portion of longest dimension and the hopper is ready to receive another load.

As may be seen, it is an object of this invention to provide a relatively small, inexpensive compactor which may be efficiently used, even with small trucks permitting a smaller, more efficient truck to make routine pick-ups and make multiple discharges into large trucks for fewer trips to the disposal site.

It is another object of this invention to control the compaction with the use of a small independent hydraulic motor rather than a power take off unit thus permitting the compaction cycle to function while the truck is traveling to another pick-up site.

It is a further object of this invention to provide a mechanism that can keep the load moving toward its destination while a much smaller and less expensive machine performs the compacting task and discharging it into the storage bin.

It is still a further object of this invention to provide a material handling system that can pick up and discharge refuse at different elevations to accommodate different truck heights without the necessity of ramps, wells, or specially coordinated equipment.

These together with other objects and advantages will become apparent from the following detailed description.

BRIEF DESCRIPTION OF DRAWING

In order that all of the structural features of the present invention may be readily understood, reference is herein made to the following drawings wherein.

DETAILED DESCRIPTION OF THE DRAWINGS

Figure 1:
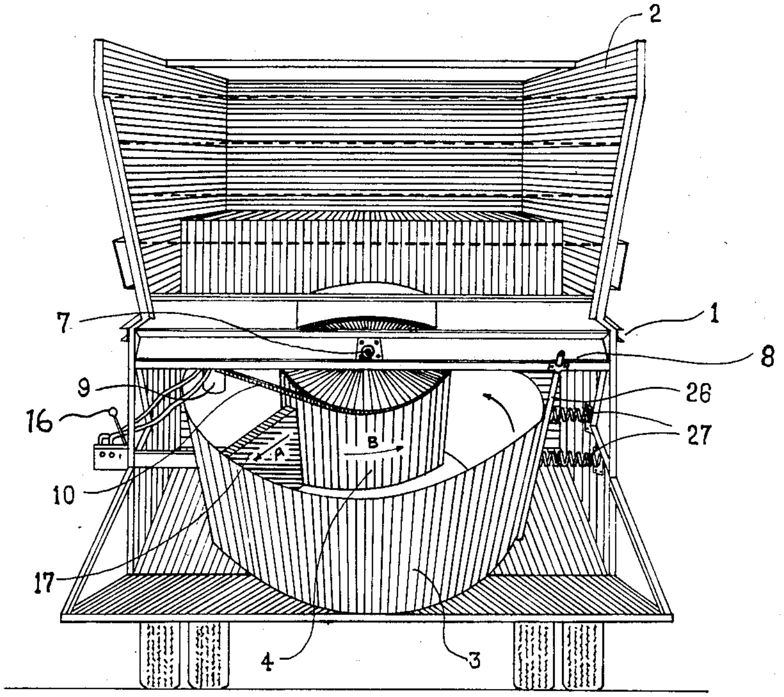
FIG. 1 is a rear perspective view of a refuse collection vehicle showing the collection hopper and compacting unit which is the subject of this invention.
Figure 2:
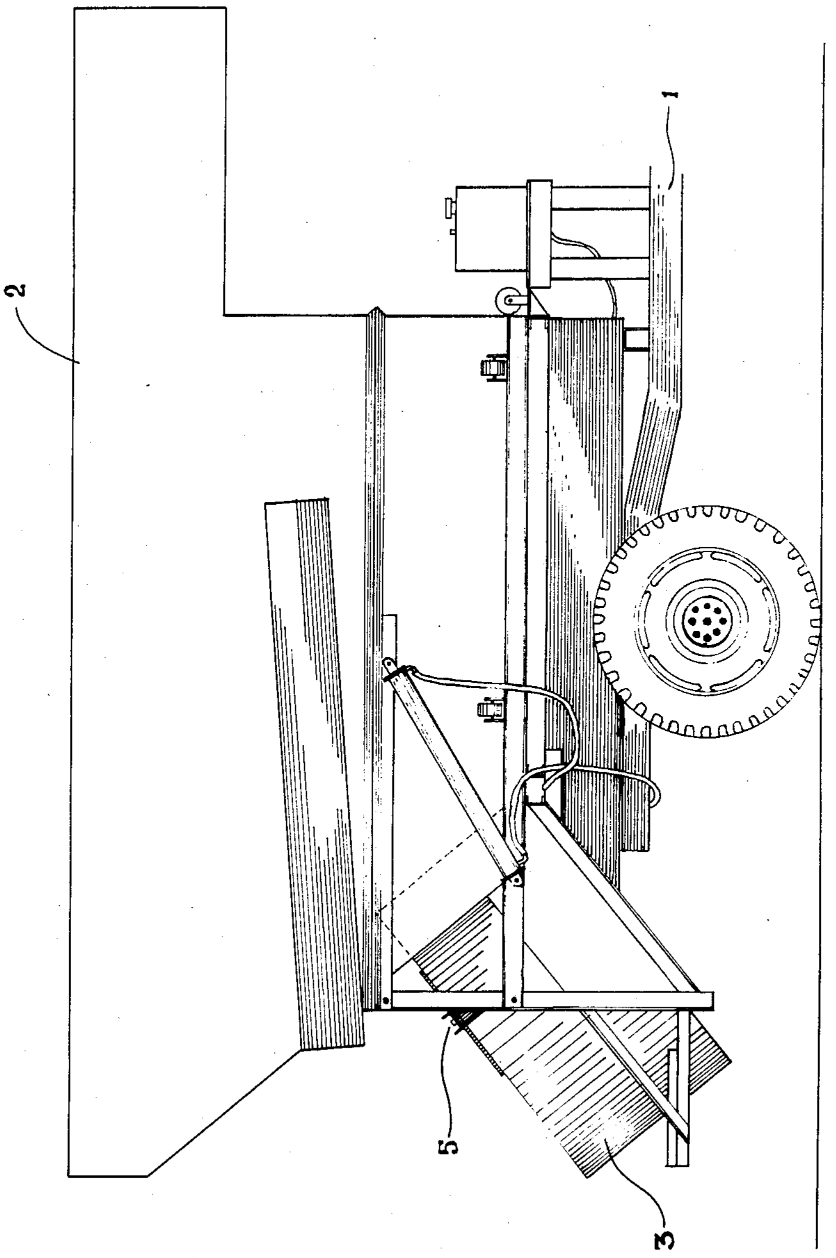
FIG. 2 is a side elevation of a refuse collection vehicle demonstrating the relative disposition of the collection hopper which is the subject of this invention.

Referring now to the drawings, FIG. 1 shows in a rear view, the present invention in conjunction with a truck, 1, used to haul compacted refuse between collection sites and to the terminal dumping sation. Truck, 1, may be of virtually any size or design from the light home-use pick-up truck to the super size dumpster-receptacle trucks. Truck, 1, includes a bed or storage receptacle, 2, which receives and stores compacted refuse until discharged at the dumping site. Any suitable means of emptying a loaded truck at the dumping site or into any other receptacle or trucks, may be employed.

The present invention includes a compactor which may be easily adapted to fit virtually any known size, style, or type truck. The compactor is comprised of a curved receptacle or hopper, 3, of a relative size to be easily mounted by any suitable means to the rear tailgate section of truck, 1. Hopper, 3, receives loose refuse to be compacted before discharged into storage receptacle, 2.

Hopper, 3, contains a cylindrical compactor drum, 4, eccentrically located within hopper, 3. Compactor drum, 4, is rotatably mounted inside a hopper 3 by axles 5 and 6 most clearly seen in FIG. 3. Axles 5 and 6 are received in bearings such as the one shown at 7 located on structural member 8 as shown in FIG. 1. Compactor drum 4 rotates in direction B as shown in FIG. 1. Compactor drum 4 is turned by hydraulic motor, 9, which is drivingly connected to compactor drum 4 by drive chain, 10, which is driven by sprockets, 11 and 12, as shown in FIG. 4. Drive chain 10 is a loop which engages sprockets 11 integrally attached to hydraulic motor shaft, 13, and sprockets, 12 integrally attached to the top perimeter of compactor drum 4.

Hydraulic motor 9 is any typical hydraulic motor expedient in the art with hydraulic fluid being supplied and conducted through hydraulic hoses 14 and 15, and operated by typical controls, 16. When controls 16 are activated, hydraulic motor 9, rotates counterclockwise, driving chain 10 in direction D as shown in FIG. 4. Compactor drum 4 is consequently caused to rotate.

Figure 3:
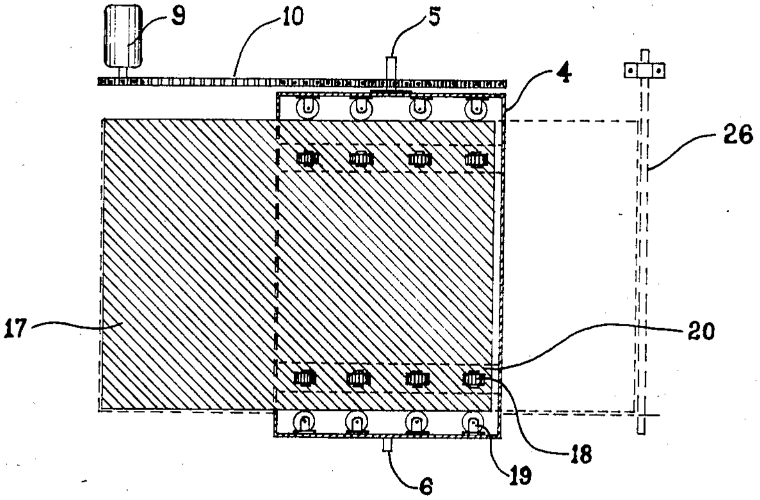
FIG. 3 is a partial sectional view of the compaction panel and compactors drum.
Figure 4:
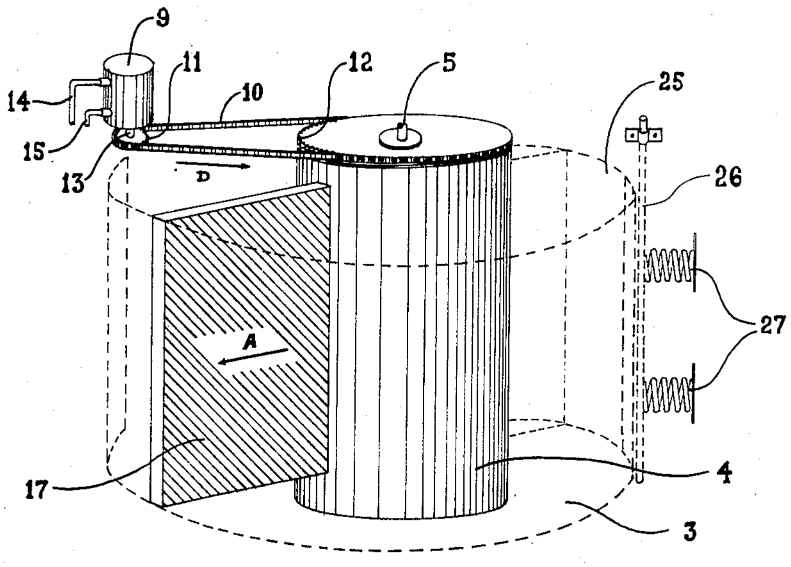
FIG. 4 is a Perspective graphic of the collection hopper, compaction blade and drum.

Compactor drum 4 is of hollow construction and is slotted to allow compactor panel, 17, to pass completely through the center of compactor drum 4 as most clearly seen FIG. 3. The inside of compactor drum 4 is provided with guide rollers 18 and 19 which facilitate the free movement of compactor panel 17 as it is permitted to slide through compactor drum 4 in either direction as any external force tends to push the compactor panel 17 in or out of compactor drum 4. Horizontal rollers 18 are attached to brace 20 which is securely attached at each end to the interior of compactor drum 4.

Compactor panel 17 is constructed of strong, durable material such as steel and comprises one face of the compactor along with hopper wall 3 and compactor drum face 4. As compactor drum 4 is rotated, so does compactor panel 17 which describes a sweeping action, sweeping loose refuse in hopper 3 as the panel rotates.

Compactor drum 4 is located adjacent to the back wall of hopper 3 and removed from the front wall of hopper 3. As the compactor drum 4 rotates, compactor panel 17 rotates. As the lag end of panel 17 approaches contact with the back wall of hopper 3, the force of gravity coupled with a contacting force is exerted along the plane of panel 17 toward the opposite or lead end of panel 17 through the center of compactor drum 4. Responsive to said forces, panel 17 moves through compacting drum 4 in direction A as shown in FIGS. 1 and 4. Continued rotation creates a reciprocating slide action of the panel 17 in and out of drum 4.

The smallest dimension between hopper 3 and compactor drum 4 is at the point of the extreme back wall of hopper 3.

It may be seen as panel 17 rotates from the position of the extreme front wall to the position of the extreme back wall of hopper 3, not only does panel 17 move through drum 4 in direction A, but the area defined within panel 17, drum 4, and hopper 3 continually decreases.

At its extreme back wall position, hopper 3 and drum 4 come into close registry with each other so that at this point any loose refuse swept by panel 17 toward the extreme back wall position of hopper 3 is compressed and compacted between drum 4, hopper 3, and panel 17.

A door, 25, is formed into hopper 3 in the vicinity of the extreme back wall position of hopper 3 so that the door opening is located at the extreme back wall position of hopper 3 and extends the full height of hopper 3. Door 25 opens outwardly into storage receptacle, 2, and is hinged by hinge rod 26 which is secured to structural member 8 and the exterior of hopper 3. Door 26 is held closed against the force of coil springs 27, which are forced toward the center of hopper 3.

In operation, as loose refuse is swept by panel 17 toward the opening of door 25, the refuse is compacted against the force of coil spring 27 until the compacting force overcomes the spring force and door 25 is forced open and compressed refuse is discharged into the door opening and consequently into storage receptacle 2, at which time springs 27 return the door to the closed position and panel 17 is forced in direction A back through drum 4.

It should be apparent that an improved trash compactor with significant advantages has been described. While the invention has been shown in only one embodiment, many modifications, changes, and substitutions in the detailed construction and combination and arrangement of elements may be employed without departing from the spirit and scope of the invention.

I claim:

1. A portable bulk material compressor comprising a semi- cylindrical hopper, means disposed within said hopper to compress and transfer small volumes of refuse into a larger storage compartment, said means comprising a rotating cylindrical drum which is slotted to receive therethrough a sweeping blade which rotates integrally with said drum and one end of the sweeping blade contacts the inside wall of the hopper, creating a sweeping and compacting action as the sweeping blade rotates, the volume defined within the sweeping blade, rotating drum, and interior hopper walls constantly decreases as the said drum and blade turn through a complete cycle, the sweeping blade sliding by gravity and momentum through said rotating drum at the point the rotating drum contacts the hopper wall upon completing one compaction cycle, thus ending one compaction cycle and beginning a subsequent compaction cycle which creates a sweeping and compressing action of the refuse against the sides of said hopper; access means communicating the hopper with the storage compartment, said access means being normally held in a closed position by means of a spring which exacts a force against said access means, maintaining said access means in a closed position until the spring means force is overcome by the compacting force and the compressed refuse is transferred from the hopper means to the storage compartment.

2. The material compressor of claim 1 wherein the said hopper is tilted at an angle to facilitate placement of refuse into said hopper.

3. The material compressor of claim 1 in which the hopper is a semi-cylinder.

4. The material compressor of claim 1 in which the cylindrical drum is located eccentrically within said hopper.

5. The material compressor of claim 4 in which the said cylindrical drum is located adjacent to the flat wall of said semi-cylindrical hopper.

6. The material compressor of claim 1 in which the drum is mounted on axles and bearings to facilitate rotation.

7. The material compressor of claim 6 in which the top of the cylindrical drum has integrally attached thereto, sprocket teeth to facilitate driving rotation.

8. The material compressor of claim 7 in which the said driving rotation is accomplished by means of a motor-driven chain.

9. The material compressor of claim 8 in which the motor is a hydraulic motor.

10. The material compressor of claim 1 in which the access means is a hinged door formed into the interior of hopper wall.

11. The material compressor of claim 10 in which the hinged door is normally closed against the force of coiled springs.

12. The material compressor of claim 11 in which the spring means are coiled springs.

13. The material compressor of claim 12 in which the force of the coiled springs is predetermined to maintain the access door in a normally closed position until sufficient compaction of the refuse contained therein creates a force which will overcome the coiled spring force with continued compaction.

14. The material compressor of claim 13 in which continued compaction forces compressed refuse from the hopper through the access door and into the storage compartment.

* * * * *